(12) United States Patent
Woo

(10) Patent No.: US 10,361,857 B2
(45) Date of Patent: Jul. 23, 2019

(54) ELECTRONIC STAMP SYSTEM FOR SECURITY INTENSIFICATION, CONTROL METHOD THEREOF, AND NON-TRANSITORY COMPUTER READABLE STORAGE MEDIUM HAVING COMPUTER PROGRAM RECORDED THEREON

(71) Applicant: SK Planet Co., Ltd., Seongnam-si, Gyeonggi-do (KR)

(72) Inventor: Jong Won Woo, Incheon (KR)

(73) Assignee: SK PLANET CO., LTD., Seongnam-si (KR)

( * ) Notice: Subject to any disclaimer, the term of this patent is extended or adjusted under 35 U.S.C. 154(b) by 271 days.

(21) Appl. No.: 15/381,011

(22) Filed: Dec. 15, 2016

(65) Prior Publication Data
US 2017/0317827 A1    Nov. 2, 2017

(30) Foreign Application Priority Data

Apr. 28, 2016 (KR) .......................... 10-2016-0051911
May 27, 2016 (KR) .......................... 10-2016-0065212

(51) Int. Cl.
*H04L 9/32* (2006.01)
*H04L 9/08* (2006.01)
*H04W 12/06* (2009.01)

(52) U.S. Cl.
CPC .......... *H04L 9/3226* (2013.01); *H04L 9/0863* (2013.01); *H04L 9/3228* (2013.01); *H04L 9/3231* (2013.01); *H04W 12/06* (2013.01)

(58) Field of Classification Search
CPC ........ H04L 9/32; H04L 9/3226; H04L 9/6228
See application file for complete search history.

(56) References Cited

U.S. PATENT DOCUMENTS

| | | | |
|---|---|---|---|
| 2004/0187007 A1* | 9/2004 | Vincent | H04M 3/5307 713/176 |
| 2009/0187764 A1* | 7/2009 | Astakhov | H04L 9/3263 713/170 |
| 2015/0312711 A1* | 10/2015 | Park | H04W 4/023 455/456.3 |

(Continued)

FOREIGN PATENT DOCUMENTS

| | | | | |
|---|---|---|---|---|
| KR | 10-2015-0059548 A | 6/2015 | | |
| KR | 20150059548 | * | 6/2015 | ............. G06F 21/64 |

*Primary Examiner* — Khang Do
(74) *Attorney, Agent, or Firm* — Brinks Gilson & Lione

(57) ABSTRACT

Provided are an electronic stamp system for security intensification, a control method thereof, and a non-transitory computer readable storage medium having a computer program recorded thereon. According to the invention, it is possible to generate an encrypted value based on a membership ID related to a user of a terminal provided from the terminal and an one-time password such as an OTP generated in the electronic stamp and provide the generated encrypted value to the terminal in the electronic stamp, provide the membership ID, electronic stamp information, and the encrypted value to an electronic stamp server from the terminal, and obtain a decryption key based on the electronic stamp ID extracted from the electronic stamp information and then decrypts the encrypted value based on the obtained decryption key, and verify authenticity of the electronic stamp by comparing the decrypted value and the membership ID in the electronic stamp server.

15 Claims, 10 Drawing Sheets

(56) References Cited

U.S. PATENT DOCUMENTS

| | | | |
|---|---|---|---|
| 2015/0341333 A1* | 11/2015 | Feng | G06Q 20/3276 713/168 |
| 2015/0371026 A1* | 12/2015 | Gnanasekaran | G06F 21/35 726/7 |
| 2017/0099135 A1* | 4/2017 | Kawase | H04L 9/16 |
| 2017/0249598 A1* | 8/2017 | Yamato | G06Q 30/02 |
| 2018/0268397 A1* | 9/2018 | Hwang | G06Q 20/32 |

* cited by examiner

ELECTRONIC STAMP SYSTEM FOR SECURITY INTENSIFICATION, CONTROL METHOD THEREOF, AND NON-TRANSITORY COMPUTER READABLE STORAGE MEDIUM HAVING COMPUTER PROGRAM RECORDED THEREON

CROSS-REFERENCE TO RELATED APPLICATION

This application claims the benefit of Korean Application No. 10-2016-0051911 filed on Apr. 28, 2016 and Korean Application No. 10-2016-0065212 filed on May 27, 2016 with the Korean Intellectual Property Office, the disclosure of which is incorporated herein by reference.

BACKGROUND OF THE INVENTION

1. Field of the Invention

The present invention related to an electronic stamp system for security intensification, a control method thereof, and a non-transitory computer readable storage medium having a computer program recorded thereon, and more particularly, to an electronic stamp system for security intensification which generates an encrypted value based on a membership ID related to a user of a terminal provided from the terminal and an one-time password such as an OTP generated in the electronic stamp and provides the generated encrypted value to the terminal in the electronic stamp, provides the membership ID, electronic stamp information, and the encrypted value to an electronic stamp server from the terminal, obtains a decryption key based on the electronic stamp ID extracted from the electronic stamp information and then decrypts the encrypted value based on the obtained decryption key, and verifies authenticity of the electronic stamp by comparing the decrypted value and the membership ID in the electronic stamp server, a control method thereof, and a non-transitory computer readable storage medium having a computer program recorded thereon.

2. Description of the Related Art

According to a membership benefit providing method using an electronic stamp, authenticity of the electronic stamp is verified using a pattern of the electronic stamp.

However, the above-described method has a problem in that the security is weakened by a malicious application which recognizes and stores a pattern of the electronic stamp in a smart phone.

RELATED ART DOCUMENT

Patent Document

Korean Unexamined Patent Application Publication No. 10-2015-0059548 (entitled Electronic stamp based on touch and local area network and electronic seal certification system using the same)

SUMMARY OF THE INVENTION

An object of the present invention is to provide an electronic stamp system for security intensification which generates an encrypted value based on a membership ID related to a user of a terminal provided from the terminal and an one-time password such as an OTP generated in the electronic stamp and provides the generated encrypted value to the terminal in the electronic stamp, provides the membership ID, electronic stamp information, and the encrypted value to an electronic stamp server from the terminal, obtains a decryption key based on the electronic stamp ID extracted from the electronic stamp information and then decrypts the encrypted value based on the obtained decryption key, and verifies authenticity of the electronic stamp by comparing the decrypted value and the membership ID in the electronic stamp server, a control method thereof, and a non-transitory computer readable storage medium having a computer program recorded thereon.

Another object of the present invention is to provide an electronic stamp system for security intensification which recognizes a fingerprint of a user through an electronic stamp to allow only a person having an authority to manipulate the electronic stamp to operate the electronic stamp, and compares a fingerprint of a user having an authority for user of the electronic stamp which is registered in advance in an electronic stamp server and a fingerprint of a user which is recognized from the electronic stamp to activate an one-time password generating unit to generate an one-time password of the electronic stamp when the fingerprints match each other, a control method thereof, and a non-transitory computer readable storage medium having a computer program recorded thereon.

According to an aspect of the present invention, a control method of an electronic stamp system for security intensification includes: transmitting a membership ID related to an app which is being executed in a terminal, electronic stamp information, an encrypted value, and identification information of the terminal to an electronic stamp server, by means of the terminal; extracting an electronic stamp ID from the electronic stamp information, by means of the electronic stamp server; generating a decryption key based on the extracted electronic stamp ID, by means of the electronic stamp server; decrypting the encrypted value transmitted from the terminal based on the generated decryption key, by means of the electronic stamp server; verifying authenticity of the electronic stamp by comparing the decrypted value and the membership ID transmitted from the terminal, by means of the electronic stamp server; transmitting information on verified authenticity of the electronic stamp to the terminal, by means of the electronic stamp server; and determining whether to perform a stamp accumulating function related to the electronic stamp or an electronic stamp sealing function based on the information on the authenticity of the electronic stamp, by means of the terminal.

In an embodiment of the present invention, the encrypted value may be obtained by connecting to the electronic stamp when the electronic stamp is in contact with an electrostatic screen of the terminal while executing an app which recognizes the electronic stamp in the terminal, by means of the terminal; transmitting the membership ID related to the app which is being executed in the terminal and the identification information of the terminal to the electronic stamp, by means of the terminal; generating a one-time password, by means of the electronic stamp; generating the encrypted value by combining the generated one-time password and the received membership ID, by means of the electronic stamp; and providing the generated encrypted value to the terminal, by means of the electronic stamp.

In an embodiment of the present invention, the transmitting of information on verified authenticity of the electronic stamp to the terminal may include any one of: verifying that the electronic stamp is genuine to transmit information indicating that the electronic stamp is genuine to the terminal, by means of the electronic stamp server when the decrypted value is identical to the membership ID transmitted from the terminal as a checking result; and verifying that the electronic stamp is forged to transmit information indicating that the electronic stamp is forged to the terminal, by means of the electronic stamp server when the decrypted value is different from the membership ID transmitted from the terminal as a checking result.

In an embodiment of the present invention, the determining of whether to perform a stamp accumulating function related to the electronic stamp or an electronic stamp sealing function based on the information on the authenticity of the electronic stamp may include: performing the stamp accumulating function related to the electronic stamp or the electronic stamp sealing function, by means of the terminal, when information, transmitted from the electronic stamp server, indicating that the electronic stamp is genuine; and displaying a stamp accumulating function performing result or an electronic stamp sealing function performing result, by means of the terminal.

In an embodiment of the present invention, the determining of whether to perform a stamp accumulating function related to the electronic stamp or an electronic stamp sealing function based on the information on the authenticity of the electronic stamp may include: stopping performing the stamp accumulating function related to the electronic stamp or the electronic stamp sealing function, by means of the terminal, when information, transmitted from the electronic stamp server, indicating that the electronic stamp is forged; and displaying information indicating that the electronic stamp is forged, by means of the terminal.

According to another aspect of the present invention, a computer program executing the methods according to the aforementioned embodiments may be stored in a non-transitory computer readable storage medium having a computer program recorded thereon.

According to another aspect of the present invention, an electronic stamp system for security intensification includes: an electronic stamp which, when the electronic stamp is in contact with an electrostatic screen of a terminal while executing an app which recognizes the electronic stamp in the terminal, communicates with the terminal and provides an encrypted value to the terminal in response to a membership ID related to the app which is being executed in the terminal, transmitted from the terminal; the terminal which provides the membership ID related to the app which is being executed in the terminal, electronic stamp information, the encrypted value provided from the electronic stamp, and identification information of the terminal; and an electronic stamp server which extracts an electronic stamp ID from the electronic stamp information, generates a decryption key based on the extracted electronic stamp ID, decrypts the encrypted value provided from the terminal based on the generated decryption key, verifies authenticity of the electronic stamp by comparing the decrypted value and the membership ID provided from the terminal, and transmits information on the verified authenticity of the electronic stamp to the terminal.

In an embodiment of the present invention, the electronic stamp may generate an one-time password and generate the encrypted value by combining the generated one-time password and the membership ID transmitted from the terminal.

In an embodiment of the present invention, when the decrypted value is identical to the membership ID transmitted from the terminal as a checking result, the electronic stamp server may verify that the electronic stamp is genuine to transmit information indicating that the electronic stamp is genuine to the terminal; and when the decrypted value is different from the membership ID transmitted from the terminal as a checking result, the electronic stamp server may verify that the electronic stamp is forged to transmit information indicating that the electronic stamp is forged to the terminal.

In an embodiment of the present invention, when the information, transmitted from the electronic stamp server, indicating that the electronic stamp is genuine to the terminal is received, the terminal may perform a stamp accumulating function related to the electronic stamp or an electronic stamp sealing function and displays a stamp accumulating function performing result or an electronic stamp sealing function performing result.

In an embodiment of the present invention, when the information, transmitted from the electronic stamp server, indicating that the electronic stamp is forged to the terminal is received, the terminal may stop performing the stamp accumulating function related to the electronic stamp or the electronic stamp sealing function and display the information indicating that the electronic stamp is forged.

According to still another aspect of the present invention, a control method of an electronic stamp system for security intensification, includes: recognizing a fingerprint of a user who wants to use an electronic stamp, by means of the electronic stamp; transmitting the recognized fingerprint information of the user and electronic stamp information to the electronic stamp server, by means of the electronic stamp; performing an authentication process of the fingerprint information, by means of the electronic stamp server; transmitting a performing result of the authentication process on the fingerprint information to the electronic stamp, by means of the electronic stamp server; and activating a one-time password generating unit in the electronic stamp so as to use the electronic stamp based on a fingerprint matching information when the fingerprint matching information is included in the performing result of the authentication process on the fingerprint information.

According to the present invention, it is possible to generate an encrypted value based on a membership ID related to a user of a terminal provided from the terminal and an one-time password such as an OTP generated in the electronic stamp and provide the generated encrypted value to the terminal in the electronic stamp, provide the membership ID, electronic stamp information, and the encrypted value to an electronic stamp server from the terminal, and obtain a decryption key based on the electronic stamp ID extracted from the electronic stamp information and then decrypts the encrypted value based on the obtained decryption key, and verify authenticity of the electronic stamp by comparing the decrypted value and the membership ID in the electronic stamp server, thereby suppressing wrongful use by duplication of the electronic stamp so that economic loss due to a membership benefit which is improperly provided is avoided.

Further, according to the present invention, a fingerprint of a user is recognized through an electronic stamp to allow only a person having an authority to manipulate the electronic stamp to operate the electronic stamp, a fingerprint of a user having an authority for a user of the corresponding electronic stamp which is registered in advance in an electronic stamp server is compared with a fingerprint of a user which is recognized from the electronic stamp to activate an one-time password generating unit to generate an one-time password of the electronic stamp when the fingerprints match each other, thereby suppressing wrongful use of the electronic stamp.

DETAILED DESCRIPTION OF THE PREFERRED EMBODIMENTS

Figure 1:
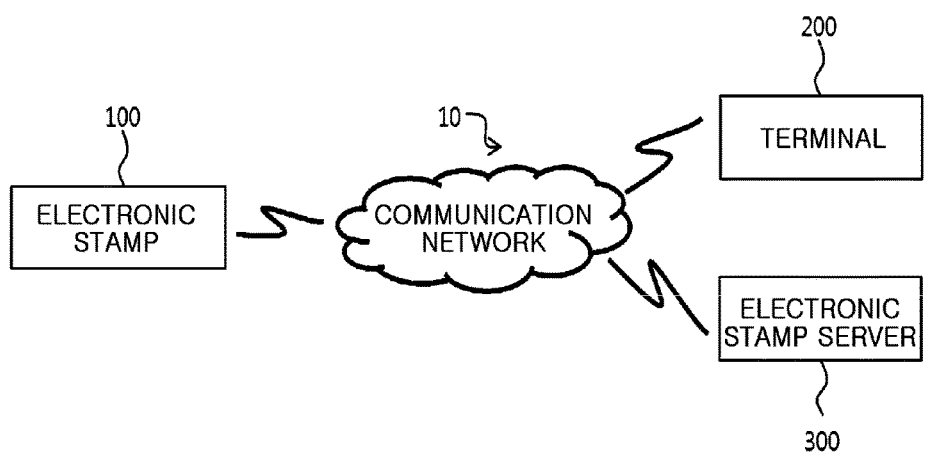
FIG. 1 is a block diagram illustrating a configuration of an electronic stamp system for security intensification according to an embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not be included or additional components or steps may be further included.

In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a block diagram illustrating a configuration of an electronic stamp system 10 for security intensification according to an embodiment of the present invention.

As illustrated in FIG. 1, an electronic stamp system for security intensification includes an electronic stamp 100, a terminal 200, and an electronic stamp server 300. However, all the constituent elements of the electronic stamp system 10 illustrated in FIG. 1 are not essential constituent elements, and the electronic stamp system 10 may be implemented by more constituent elements than the constituent elements illustrated in FIG. 1 or less constituent elements therethan.

When a touch operation is performed on the terminal 200 of the electronic stamp 100 while executing a specific app in the terminal 200, a short range communication function is performed between the electronic stamp 100 and the terminal 200. Thereafter, the electronic stamp 100 generates an encrypted value based on a membership ID related to an executing app which is transmitted from the terminal 200 (or a membership ID related to a user of the terminal 200) and an one-time password, such as an OTP, generated in the electronic stamp 100 and provides the generated encrypted value to the terminal 200. Thereafter, the terminal 200 transmits the membership ID, electronic stamp information, and an encrypted value to the electronic stamp server 300. Thereafter, the electronic stamp server 300 obtains a decryption key based on the electronic stamp ID extracted from the electronic stamp information and then decrypts the encrypted value based on the obtained decryption key and compares the decrypted value and the membership ID to verify authenticity of the electronic stamp. Thereafter, the electronic stamp server 300 provides information on the authenticity of the electronic stamp to the terminal 200.

The electronic stamp (or the electronic stamp device) 100 provides an electronic stamping function to the terminal 200 in which a specific app related to the electronic stamp 100 is installed.

Figure 2:
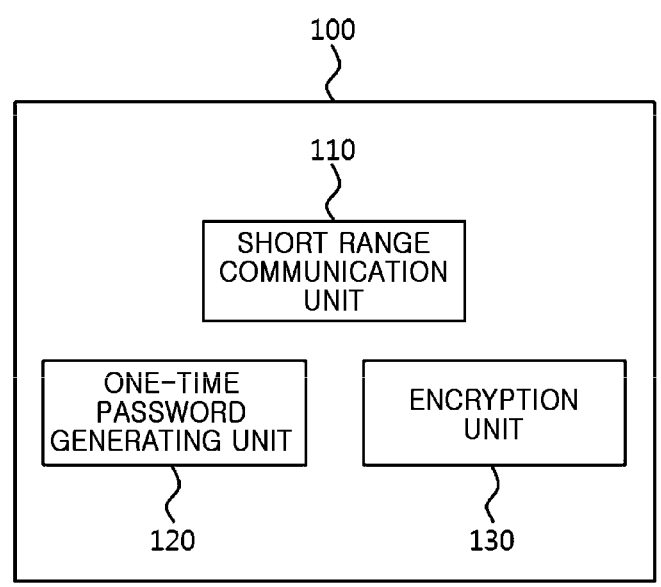
FIG. 2 is a block diagram illustrating a configuration of an electronic stamp according to an embodiment of the present invention.

As illustrated in FIG. 2, the electronic stamp 100 includes a short range communication unit 110, an one-time password generating unit 120, and an encryption unit 130. However, all the constituent elements of the electronic stamp 100 illustrated in FIG. 2 are not essential constituent elements, and the electronic stamp 100 may be implemented by more constituent elements than the constituent elements illustrated in FIG. 2 or less constituent elements therethan.

When the electronic stamp 100 is in contact with an electrostatic screen of the terminal 200 while executing an app (or application) which recognizes the electronic stamp 100 in the terminal 200, the short range communication unit (or an electronic stamp communication unit) 110 communicates with the terminal 200 by short range communication.

Here, a short range communication technology may include Bluetooth, RFID (radio frequency identification), IrDA (infrared data association), UWB (ultra-wideband), ZigBee, NFC (near field communication), USC (ultra sound communication), VLC (visible light communication), Wi-Fi, Wi-Fi direct or the like.

That is, when a stamp accumulating function and an electronic stamp sealing function are provided through the electronic stamp 100 in relation to the app which is being executed in the terminal 200, the short range communication unit 110 allows the electronic stamp 100 to be in contact with the electrostatic screen of the terminal 200 in accordance with the manipulation of the user of the electronic stamp 100 and then connects the electronic stamp 100 with the terminal 200 through the short range communication.

Further, the short range communication unit 110 receives a membership ID related to an app which is being executed in the terminal 200 (or a membership ID related to a user of the terminal 200) and identification information of the terminal 200 which are transmitted from the terminal 200. Here, the identification information of the terminal 200 includes a mobile directory number (MDN), a mobile IP, a mobile MAC, a subscriber identify module (Sim) card unique information, and a serial number.

Further, the short range communication unit 110 transmits an encrypted value generated through the encryption unit 130 to the terminal 200.

The one-time password generating unit (or OTP generating unit) 120 generates an one-time password such as One Time Password (OTP).

The encryption unit 130 generates an encrypted value based on the membership ID received from the short range communication unit 110 (or a membership ID related to an app which is being executed in the terminal 200/a membership ID related to a user of the terminal 200) and the one-time password generated by the one-time password generating unit 120.

That is, the encryption unit 130 combines the membership ID received from the short range communication unit 110 and the one-time password generated by the one-time password generating unit 120 to generate the encrypted value.

Figure 3:
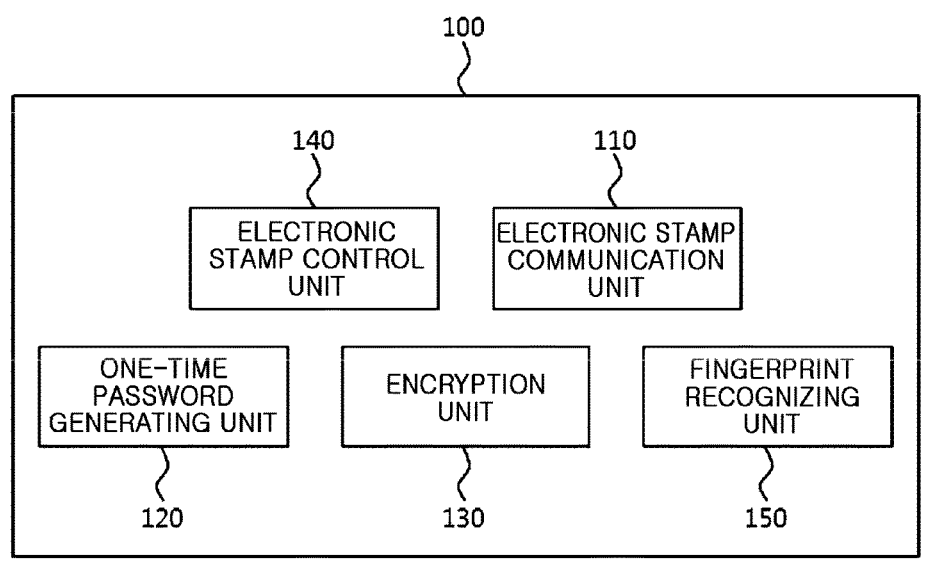
FIG. 3 is a block diagram illustrating a configuration of an electronic stamp according to another embodiment of the present invention.

As illustrated in FIG. 3, the electronic stamp 100 includes a fingerprint recognizing unit 140, an electronic stamp communication unit 110, a one-time password generating unit 120, an encryption unit 130, and an electronic stamp control unit 150. However, all the constituent elements of the electronic stamp 100 illustrated in FIG. 3 are not essential constituent elements, and the electronic stamp 100 may be implemented by more constituent elements than the constituent elements illustrated in FIG. 3 or less constituent elements therethan.

The fingerprint recognizing unit 140 is constituted by a sensor (or a fingerprint recognizing sensor) to recognize a fingerprint of the user.

Further, the fingerprint recognizing unit 140 recognizes a fingerprint of a user who wants to use the electronic stamp 100.

The electronic stamp communication unit 110 connects an arbitrary internal component with at least one arbitrary external terminal through a wired/wireless communication network to communicate each other. In this case, the arbitrary external terminal may include the terminal 200 and the electronic stamp server 300. Here, a wireless internet technique includes wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS), and the like. The terminal communication unit 210 transmits and receives data in accordance with at least one wireless Internet technique within a range including also Internet techniques which are not listed above. Further, the short range communication technique may include Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, or the like. Furthermore, the wired communication technique may include power line communication (PLC), USB communication, Ethernet, serial communication, an optical/coaxial cable, or the like.

Further, the electronic stamp communication unit 110 may mutually transmit information with any terminal through a universal serial bus (USB).

Further, the electronic stamp communication unit 110 transmits and receives a wireless signal to and from a base station, a terminal 200, and the electronic stamp server 300 on a mobile communication network built according to technical standards for mobile communication or communication schemes (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like).

Further, the electronic stamp communication unit 110 transmits fingerprint information recognized by the fingerprint recognizing unit 140 and electronic stamp information (for example, including an electronic stamp ID) to the electronic stamp server 300, by the control of the electronic stamp control unit 150.

Further, the electronic stamp communication unit 110 receives fingerprint mismatching information (or authentication failure information) and fingerprint matching information (or authentication success information) transmitted from the electronic stamp server 300, in response to the fingerprint information and the electronic stamp information which are previously transmitted, by the control of the electronic stamp control unit 150.

When the electronic stamp 100 is in contact with an electrostatic screen of the terminal 200 while executing an app (or application) which recognizes the electronic stamp 100 in the terminal 200, the electronic stamp communication unit 110 communicates with the terminal 200 by short range communication.

That is, when a stamp accumulating function and an electronic stamp sealing function are provided through the electronic stamp 100 in relation to the app which is being executed in the terminal 200, the electronic stamp communication unit 110 allows the electronic stamp 100 to be in contact with the electrostatic screen of the terminal 200 in accordance with the manipulation of the user of the electronic stamp 100 and then connects the electronic stamp 100 with the terminal 200 through the short range communication.

Further, the electronic stamp communication unit 110 receives a membership ID related to an app which is being executed in the terminal 200 (or a membership ID related to a user of the terminal 200) and identification information of the terminal 200 which are transmitted from the terminal 200. Here, the identification information of the terminal 200 includes a mobile directory number (MDN), a mobile IP, a mobile MAC, a subscriber identify module (Sim) card unique information, and a serial number.

Further, the electronic stamp communication unit 110 transmits an encrypted value generated through the encryption unit 130 to the terminal 200.

The one-time password generating unit (or OTP generating unit) 130 generates an one-time password such as One Time Password (OTP).

In this case, when the one-time password generating unit 120 is activated, the one-time password generating unit 120 may generate an one-time password in accordance with information indicating whether to match the fingerprints which is received through the electronic stamp communication unit 110, by the control of the electronic stamp control unit 150.

That is, when the fingerprint mismatching information (or the authentication failure information) is received through the electronic stamp communication unit 110, the one-time password generating unit 120 maintains an inactivation state by the control of the electronic stamp control unit 150. Further, even though the membership ID related to the app which is being executed in the terminal 200 (or a membership ID related to the user of the terminal 200), the identification information of the terminal 200, and the like which are transmitted from the terminal 200 through the electronic stamp communication unit 110 are received, the one-time password generating unit 120 does not generate a one-time password.

Further, when the fingerprint matching information (or the authentication success information) is received through the electronic stamp communication unit 110, the one-time password generating unit 120 maintains an activation state by the control of the electronic stamp control unit 150. Further, as soon as the membership ID related to the app which is being executed in the terminal 200 (or a membership ID related to the user of the terminal 200) and the identification information of the terminal 200 which are transmitted from the terminal 200 through the electronic stamp communication unit 110 are received, the one-time password generating unit 120 generates an one-time password.

Further, after generating the one-time password one time, the one-time password generating unit 120 is switched (maintained) from the activation state to the inactivation state. After re-performing the user authentication process with the electronic stamp server 300 through the fingerprint recognizing unit 140, the activation state of the one-time password generating unit 120 may be maintained after successfully performing the re-performed user authentication process.

Further, when a predetermined time (for example, five minutes) has elapsed after generating a last one-time password (or when the one-time password generating function is not additionally performed within a predetermined time after generating the last one-time password), the one-time password generating unit 120 is switched (maintained) from the activation state to the inactivation state, by the control of the electronic stamp control unit 150. Further, after re-performing the user authentication process with the electronic stamp server 300 through the fingerprint recognizing unit 140, the activation state of the one-time password generating unit 120 may be maintained after successfully performing the re-performed user authentication process.

Further, after successfully performing the first user authentication process, the one-time password generating unit 120 is switched (or maintained) from the activation state into the inactivation state after generating the one-time passwords at a predetermined number of times (for example, 10 times), by the control of the electrostatic stamp control unit 150. Further, the activation state may be maintained again when the re-performed user authentication process is successfully performed after re-performing the user authentication process with the electronic stamp server 300 through the fingerprint recognizing unit 140.

As described above, the one-time password generating unit 120 may maintain the activation state in accordance with various conditions.

The encryption unit 130 generates an encrypted value based on the membership ID received from the electronic stamp communication unit 110 (or a membership ID related to an app which is being executed in the terminal 200/a membership ID related to a user of the terminal 200) and the one-time password generated by the one-time password generating unit 120.

That is, the encryption unit 130 combines the membership ID received from the electronic stamp communication unit 110 and the one-time password generated by the one-time password generating unit 120 to generate the encrypted value.

The electronic stamp control unit 150 performs an overall control function of the electronic stamp 100.

Further, the electronic stamp control unit 150 performs an overall control function of the electronic stamp 100 using a program and data stored in a memory (not illustrated). The electronic stamp control unit 150 may include a RAM, a ROM, a CPU, a GPU, and a bus and the RAM, the ROM, the CPU, the GPU, and the like are connected to each other through the bus.

Further, the electronic stamp control unit 150 transmits fingerprint information of the user recognized by the fingerprint recognizing unit 140 and electronic stamp information (for example, including an electronic stamp ID) to the electronic stamp server 300, through the electronic stamp communication unit 110.

Further, the electronic stamp control unit 150 receives fingerprint mismatching information indicating that the fingerprint information does not match the fingerprint information which is registered in advance in the electronic stamp server 300 (or authentication failure information indicating that the authentication process is failed) and fingerprint matching information indicating that the fingerprint information matches the fingerprint information which is registered in advance in the electronic stamp server 300 (or authentication success information indicating that the authentication process is normally performed) which are transmitted from the electronic stamp server 300, in response to the fingerprint information and the electronic stamp information (including the electronic stamp ID) which are previously transmitted, through the electronic stamp communication unit 110.

Further, the electronic stamp control unit 150 determines whether to activate the one-time password generating unit 120 based on the authentication result on the received fingerprint information.

That is, when the fingerprint matching information (or the authentication success information) is received, the electronic stamp control unit 150 activates the one-time password generating unit 120 to use the electronic stamp based on the received fingerprint matching information.

Further, when the fingerprint mismatching information (or the authentication failure information) is received, the electronic stamp control unit 150 maintains an inactivation state of the one-time password generating unit 120 to use the electronic stamp based on the received fingerprint mismatching information.

The terminal 200 may be applied to various terminals such as a smart phone, a portable terminal, a mobile terminal, a personal digital assistant (PDA), a portable multimedia player (PMP) terminal, a telematics terminal, a navigation terminal, a personal computer, a notebook computer, a slate PC, a tablet PC, an ultrabook, a wearable device (for example, including a smart watch, a smart glass, or a head mounted display (HMD)), a Wibro terminal, an internet protocol television (IPTV) terminal, a smart TV, a digital broadcasting terminal, a television, a 3D television, a home theater system, an audio video navigation (AVN) terminal, an audio/video (A/V) system, and a flexible terminal.

Figure 4:
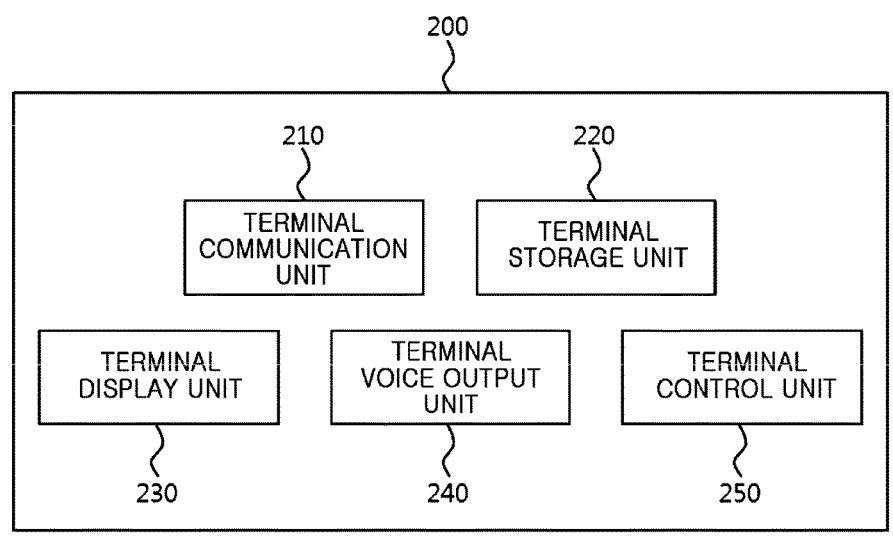
FIG. 4 is a block diagram illustrating a configuration of a terminal according to an embodiment of the present invention.

As illustrated in FIG. 4, the terminal 200 is constituted by a terminal communication unit 210, a terminal storage unit 220, a terminal display unit 230, a terminal voice output unit 240, and a terminal control unit 250. However, all the constituent elements of the terminal 200 illustrated in FIG. 4 are not essential constituent elements, and the terminal 200 may be implemented by more constituent elements than the constituent elements illustrated in FIG. 4 or less constituent elements therethan.

The terminal communication unit 210 communicates with any internal constituent element or at least one arbitrary external terminal via a wired/wireless communication network. In this case, the arbitrary external terminal may include the terminal 100 and the electronic stamp server 300. Here, a wireless internet technique includes wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS). The terminal communication unit 210 transmits and receives data in accordance with at least one wireless Internet technique within a range including also Internet techniques which are not listed above. Further, the short range communication technique may include Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, or the like. Furthermore, the wired communication technique may include power line communication (PLC), USB communication, Ethernet, serial communication, an optical/coaxial cable, or the like.

Further, the terminal communication unit 210 may mutually transmit information with any terminal through a universal serial bus (USB).

Further, the terminal communication unit 210 transmits and receives a wireless signal to and from a base station, an electronic stamp 100, and the electronic stamp server 300 on a mobile communication network built according to technical standards for mobile communication or communication schemes (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like).

Further, when the electronic stamp 100 is in contact with an electrostatic screen of the terminal display unit 230 while executing an app (or application) which recognizes the electronic stamp 100 in the terminal 200, the terminal communication unit 210 is connected (or communicates) with the electronic stamp 100 by the control of the terminal control unit 250 by short range communication.

Further, the terminal communication unit 210 transmits a membership ID related to an app which is being executed in the terminal 200 (or a membership ID related to a user of the terminal 200) and identification information of the terminal 200 to the electronic stamp 100, by the control of the terminal control unit 250. Here, the identification information of the terminal 200 includes an MDN, a mobile IP, a mobile MAC, a subscriber identify module (Sim) card unique information, and a serial number.

The terminal storage unit 220 stores various user interfaces UI and graphic user interfaces GUI.

Further, the terminal storage unit 220 stores data and programs which are required to operate the terminal 200.

That is, the terminal storage unit 220 may store a plurality of application programs (or applications) which are driven in the terminal 200 and data and commands for the operation of the terminal 200. At least some of the application programs may be downloaded from an external service providing device through wireless communication. Further, at least some of the application programs may be provided on the terminal 200 since a releasing time in order to support a basic function (for example, phone call receiving and sending functions, message receiving and transmitting functions) of the terminal 200. In the meantime, the application program is stored in the terminal storage unit 220 and installed in the terminal 200 to be driven to perform an operation (or a function) of the terminal 200 by the terminal control unit 250.

Further, the terminal storage unit 220 may include at least one storing medium of a flash memory type, a hard disk type, a multimedia card micro type, a card type memory (for example, an SD or XD memory), a magnetic memory, a magnetic disk, an optical disk, a random access memory (RAM), a static random access memory, a read-only memory (ROM), an electrically erasable programmable read-only memory (EEPROM), and a programmable read-only memory (PROM). Further, the terminal 200 may operate a web storage which performs a storing function of the terminal storage unit 220 on the Internet or operate in association with the web storage.

Further, the terminal storage unit 220 stores information related to a plurality of apps (or applications) installed (or registered) in the terminal 200 by the control of the terminal control unit 250.

The terminal display device 230 may display various contents such as various menu screens using the user interface and/or graphic user interface stored in the terminal storage unit 220, by the control of the terminal control unit 250. Here, the contents displayed on the terminal display unit 230 may include a menu screen including various texts, image data (including various information data), and data such as icons, list menus, or a combo boxes. The terminal display unit 230 may be a touch screen.

Further, the terminal display unit 230 may include at least one of a liquid crystal display (LCD), a thin film transistor liquid crystal display (TFT LCD), an organic light emitting diode (OLED), a three dimensional display (3D display), an e-ink display, and a light emitting diode (LED).

Further, the terminal display unit 230 may be constituted as a stereoscopic display unit which displays a stereoscopic image.

A 3D display scheme such as a stereoscopic type (a glass type), an auto stereoscopic type (a glassless type), or a projection scheme (a holographic type) may be applied to the stereoscopic display unit.

Further, the terminal display unit 230 displays an app executing result screen related to a selected app according to selection of the user, among a plurality of app media which is installed in advance in the terminal 200, by the control of the terminal control unit 250.

The terminal voice output unit 240 outputs voice information included in a signal-processed signal by the terminal control unit 250. Here, the terminal voice output unit 240 may include a receiver, a speaker, a buzzer, and the like.

Further, the terminal voice output unit 240 outputs a guidance voice generated by the terminal control unit 250.

Further, the terminal voice output unit 240 outputs voice information corresponding to an app executing result screen related to a selected app according to selection of the user, among a plurality of app media which is installed in advance in the terminal 200, by the control of the terminal control unit 250.

The terminal control unit 250 performs an overall control function of the terminal 200.

Further, the terminal control unit 250 performs an overall control function of the terminal 200 using a program and data stored in the terminal storage unit 220. The terminal control unit 250 may include a RAM, a ROM, a CPU, a GPU, and a bus and the RAM, the ROM, the CPU, the GPU, and the like are connected to each other through the bus. The CPU accesses the terminal storage unit 220 to perform booting using an O/S stored in the terminal storage unit 220 and performs various operations using various programs, contents, and data stored in the terminal storage unit 220.

Further, the terminal control unit 250 installs (or registers) various types of apps (or applications) in the terminal 200 by interworking with a plurality of service providing devices (or servers) which is not illustrated.

Further, the terminal control unit 250 executes one app (or application) according to the selection of the user among the plurality of app media which is installed in advance in the terminal 200.

Further, when the electronic stamp 100 is in contact (or touch) with an electrostatic screen of the terminal display unit 230 while executing an app (or application) which recognizes the electronic stamp 100 in the terminal 200, the terminal control unit 250 controls the terminal communication unit 210 to be connected (or communicate) with the electronic stamp 100 by short range communication.

Further, the terminal control unit 250 transmits a membership ID related to an app which is being executed in the terminal 200 (or a membership ID related to a user of the terminal 200) and identification information of the terminal 200 to the electronic stamp 100, through the terminal communication unit 210.

Further, the terminal control unit 250 receives an encrypted value transmitted from the electronic stamp 100 in response to the membership ID related to an app which is being executed in the terminal 200 (or a membership ID related to the user of the terminal 200) and identification information of the terminal 200 which are previously transmitted, through the terminal communication unit 210.

Further, the terminal control unit 250 transmits a membership ID related to an app which is being executed in the terminal 200 (or a membership ID related to a user of the terminal 200), the electronic stamp information, the encrypted value, and identification information of the terminal 200 to the electronic stamp 300, through the terminal communication unit 210. Here, the electronic stamp information includes an electronic stamp ID used to generate a description key for decrypting the encrypted value.

Further, the terminal control unit 250 receives information indicating authenticity of the electronic stamp transmitted from the electronic stamp server 300 in response to the membership ID related to an app which is being executed in the terminal 200 (or a membership ID related to the user of the terminal 200), the electronic stamp information, the encrypted value, and identification information of the terminal 200 which are previously transmitted, through the terminal communication unit 210.

Further, the terminal control unit 250 determines whether to perform a stamp accumulating function (or whether to perform an electronic stamp sealing function) related to the electronic stamp, based on the received information on the authenticity of the electronic stamp.

That is, when it is verified that the electronic stamp is genuine, the terminal control unit 250 performs the stamp accumulating function and the electronic stamp sealing function related to the electronic stamp.

Further, the terminal control unit 250 outputs an electronic stamp accumulating function performing result (or an electronic stamp sealing function performing result) through the terminal display unit 230 and/or the terminal voice output unit 240.

Further, when it is verified that the electronic stamp is forged, the terminal control unit 250 stops stamp accumulation related to the electronic stamp (or stamp accumulating function or an electronic stamp sealing function) and outputs information indicating that the electronic stamp is forged through the terminal display unit 230 and/or the terminal voice output unit 240.

Further, the terminal 200 may further include an interface unit (not illustrated) serving as an interface with all external apparatuses which are connected to the terminal 200. For example, the interface unit may be constituted by a wired/wireless headset port, an external charger port, a wired/wireless data port, a memory card port, a port connecting devices with identification modules, an audio input/output (I/O) port, a video input/output (I/O) port, an earphone port, and the like. Here, the identification module is a chip which stores various information for authenticating a permission of the terminal 200 and may include a user identity module (UIM), a subscriber identity module (SIM), a universal subscriber identity module (USIM), and the like. Further, the device provided with the identification module may be prepared in a smart card form. Accordingly, the identification module may be connected with the terminal 200 through the port. Such an interface unit receives data or power from an external device to transmit the received data or power to each constituent element in the terminal 200 or transmit the data in the terminal 200 to the external device.

Further, the interface unit may be a passage through which the power from a cradle is supplied to the corresponding terminal 200 when the terminal 200 is connected to an external cradle or a passage through which various command signals input from the cradle by the user is transferred to the corresponding terminal 200. Various command signals input from the cradle or the corresponding power may also operate by a signal for recognizing that the terminal 200 is accurately installed on the cradle.

Further, the terminal 200 may further include an input unit (not illustrated) for receiving a signal according to a button operation of the user or any function selection or receiving a command or a control signal created by an operation such as an operation of touching/scrolling the displayed screen.

The input unit is a means for receiving at least one of a user's command, selection, data, and information and may include a plurality of input keys and function keys for receiving figure or text information and setting various functions.

Further, the input unit may use various devices such as a key pad, a dome switch, a touch pad (a pressure resistive type/a contact capacitive type), a touch screen, a jog wheel, a jog switch, a jog shuttle, a mouse, a stylus pen, and a touch pen. Particularly, when the terminal display unit 230 is formed in a touch screen form, some or all of the input functions may be performed by the terminal display unit 230.

Further, each constituent element (or each module) of the terminal 200 may be software stored on a memory (or the terminal storage unit 220) of the terminal 200. The memory may be an internal memory of the terminal 200 and may an external memory or other types of storage devices. Further, the memory may be a non-volatile memory. The software stored on the memory may include a command set to allow the terminal 200 to perform a specific operation while executing.

Figure 5:
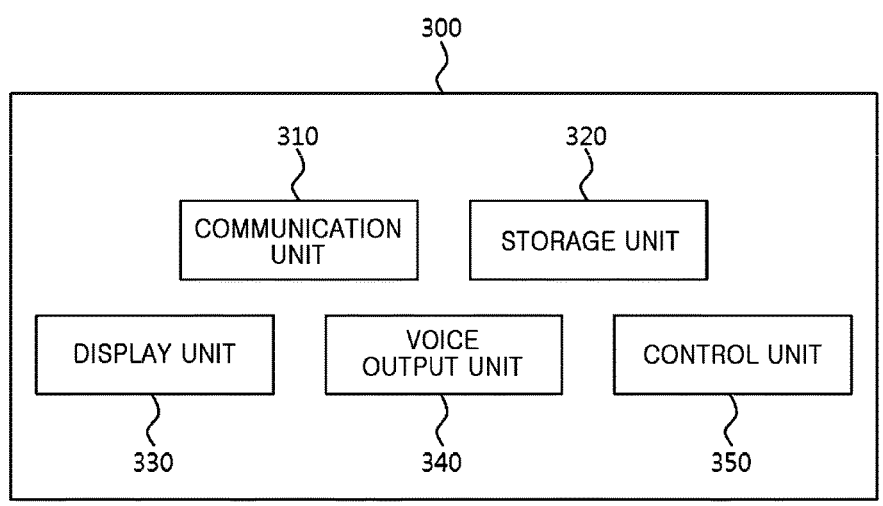
FIG. 5 is a block diagram illustrating a configuration of an electronic stamp server according to an embodiment of the present invention.

As illustrated in FIG. 5, an electronic stamp server (or an electronic stamp management server) 300 is constituted by a communication unit 310, a storage unit 320, a display unit 330, a voice output unit 340, and a control unit 350. However, all the constituent elements of the electronic stamp server 300 illustrated in FIG. 5 are not essential constituent elements, and the electronic stamp server 300 may be implemented by more constituent elements than the constituent elements illustrated in FIG. 5 or less constituent elements therethan.

The communication unit 310 communicates with any internal constituent element or at least one arbitrary external terminal via a wired/wireless communication network. In this case, the arbitrary external terminal may include the electronic stamp 100 and the terminal 200. Here, a wireless internet technique includes wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long term evolution (LTE), long term evolution-advanced (LTE-A), wireless mobile broadband service (WMBS), and the like. The communication unit 310 transmits and receives data in accordance with at least one wireless Internet technique within a range including Internet techniques which are not listed above. Further, the short range communication technique may include Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, or the like. Further, the wired communication technique may include power line communication (PLC), USB communication, Ethernet, serial communication, optical/coaxial cable, or the like.

Further, the communication unit 310 may exchange information with any terminal through a universal serial bus (USB).

Further, the communication unit 310 receives the fingerprint information and the electronic stamp information (including the electronic stamp ID) which are transmitted from the electronic stamp 100, by the control of the control unit 350.

Further, the communication unit 310 receives a membership ID related to an app which is being executed in the terminal 200 (or a membership ID related to a user of the terminal 200), the electronic stamp information, the encrypted value, and the identification information of the terminal 200 which are transmitted from the terminal 200, by the control of the control unit 350.

The storage unit 320 stores various user interfaces UI and graphic user interfaces GUI.

Further, the storage unit 320 stores data and programs required to operate the electronic stamp server 300.

Further, the storage unit 320 may include at least one storage medium of a flash memory type, a hard disk type, a multimedia card micro type, a card type memory (for example, an SD or XD memory), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Further, the electronic stamp server 300 may operate a web storage which performs a storing function of the storage unit 320 on the Internet or operate in association with the web storage.

Further, the storage unit 320 stores one or more fingerprint information for every electronic stamp, by the control of the control unit 350.

Further, the storage unit 320 stores the fingerprint information and the electronic stamp information (including the electronic stamp ID) which are transmitted from the electronic stamp 100 which is received through the communication unit 310, by the control of the control unit 350.

Further, the storage unit 320 stores the membership ID related to an app which is being executed in the terminal 200 (or a membership ID related to a user of the terminal 200), the electronic stamp information, the encrypted value, and the identification information of the terminal 200 which are received through the communication unit 310, by the control of the control unit 350.

The display device 330 may display various contents such as various menu screens using a user interface and/or graphic user interface stored in the storing unit 320, by the control of the control unit 350. Here, the contents displayed on the display unit 330 may include a menu screen including various texts, image data (including various information data), and data such as icons, list menus, or a combo boxes. Further, the display unit 330 may be a touch screen.

Further, the display unit 330 may include at least one of a liquid crystal display (LCD), a thin film transistor liquid crystal display (TFT LCD), an organic light emitting diode (OLED), a flexible display, a three dimensional display, an e-ink display, and a light emitting diode (LED).

Further, the display unit 330 displays the fingerprint information and the electronic stamp information (including the electronic stamp ID) which are transmitted from the electronic stamp 100 which is received through the communication unit 310, by the control of the control unit 350.

Further, the display unit 330 displays the membership ID related to an app which is being executed in the terminal 200 (or a membership ID related to a user of the terminal 200), the electronic stamp information, the encrypted value, and the identification information of the terminal 200 which are received through the communication unit 310, by the control of the control unit 350.

The voice output unit 340 outputs voice information included in a signal-processed signal by the control unit 350. Here, the voice output unit 340 may include a receiver, a speaker, a buzzer, and the like.

Further, the voice output unit 340 outputs a guidance voice generated by the control unit 350.

Further, the voice output unit 340 outputs voice information corresponding to the membership ID related to an app which is being executed in the terminal 200 (or a membership ID related to a user of the terminal 200), the electronic stamp information, the encrypted value, and the identification information of the terminal 200 which are received through the communication unit 310, by the control of the control unit 350.

The control unit 350 performs an overall control function of the electronic stamp server 300.

Further, the control unit 350 performs an overall control function of the electronic stamp server 300 using a program and data stored in the storage unit 320. The control unit 350 may include a RAM, a ROM, a CPU, a GPU, and a bus and the RAM, the ROM, the CPU, the GPU, and the like are connected to each other through the bus. The CPU accesses the storage unit 320 to perform booting using an O/S stored in the storage unit 320 and performs various operations using various programs, contents, and data stored in the storage unit 320.

Further, the control unit 350 receives a membership ID related to an app which is being executed in the terminal 200 (or a membership ID related to a user of the terminal 200), the electronic stamp information, the encrypted value, and the identification information of the terminal 200 which are transmitted from the terminal 200, through the communication unit 310.

Further, the control unit 350 extracts the electronic stamp ID from the received electronic stamp information.

Further, the control unit 350 generates a decryption key based on the extracted electronic stamp ID.

That is, the control unit 350 obtains a decryption key from the extracted electronic stamp ID.

Further, the control unit 350 decrypts the encrypted value which is previously received based on the generated (or obtained) decryption key.

Further, the control unit 350 compares the decrypted value with the previously received membership ID to verify (or determine) authenticity of the electronic stamp.

Further, the control unit 350 transmits information on the verified (or determined) authenticity of the electronic stamp to the terminal 200 through the communication unit 310. Here, the information on the authenticity of the electronic stamp includes information indicating that the electronic stamp is genuine and information indicating that the electronic stamp is forged.

That is, as a checking result (or a determination result), when the decrypted value is same as the membership ID, the control unit 350 verifies that the electronic stamp is genuine to transmit the information indicating that the electronic stamp is genuine to the terminal 200 through the communication unit 310.

Further, as the checking result (or the determination result), when the decrypted value is different from the membership ID, the control unit 350 verifies that the electronic stamp is forged to transmit the information indicating that the electronic stamp is forged to the terminal 200 through the communication unit 310.

Further, the control unit 350 receives the fingerprint information and the electronic stamp information (including the electronic stamp ID) which are transmitted from the electronic stamp 100, through the communication unit 310.

Further, the control unit 350 performs an authentication process on the fingerprint information based on the received fingerprint information and electronic stamp information.

That is, the control unit 350 determines (or checks) whether the fingerprint information which is registered in advance in the storage unit 320 correspondingly to the electronic stamp information matches the previously received fingerprint information. Here, there may be one or more fingerprint information which is registered in advance correspondingly to the electronic stamp information.

As the checking result (or the determination result), when the fingerprint information which is registered in advance in the storage unit 320 correspondingly to the electronic stamp information does not match the previously received fingerprint information (or when there is no fingerprint information which matches the previously received fingerprint information among a plurality of fingerprint information registered in advance in the electronic stamp server 300 correspondingly to the electronic stamp information), the control unit 350 transmits the fingerprint mismatching information indicating that the fingerprint information does not match the fingerprint information which is registered in advance (or the authentication failure information indicating that the authentication process is failed) to the electronic stamp 100 through the communication unit 310.

Further, as the checking result (or the determination result), when the fingerprint information which is registered in advance in the storage unit 320 correspondingly to the electronic stamp information matches the previously received fingerprint information (or when there is fingerprint information which matches the previously received fingerprint information among a plurality of fingerprint information registered in advance in the electronic stamp server 300 correspondingly to the electronic stamp information), the control unit 350 transmits the fingerprint matching information indicating that the fingerprint information matches the fingerprint information which is registered in advance (or the authentication success information indicating that the authentication process is successfully performed) to the electronic stamp 100 through the communication unit 310.

Further, the control unit 350 receives a membership ID related to an app which is being executed in the terminal 200 (or a membership ID related to a user of the terminal 200), the electronic stamp information, the encrypted value, and the identification information of the terminal 200 which are transmitted from the terminal 200, through the communication unit 310.

Further, the control unit 350 extracts the electronic stamp ID from the received electronic stamp information.

Further, the control unit 350 generates a decryption key based on the extracted electronic stamp ID.

That is, the control unit 350 obtains a decryption key from the extracted electronic stamp ID.

Further, the control unit 350 decrypts the encrypted value which is previously received based on the generated (or obtained) decryption key.

Further, the control unit 350 compares the decrypted value with the previously received membership ID to verify (or determine) authenticity of the electronic stamp.

Further, the control unit 350 transmits information on the verified (or determined) authenticity of the electronic stamp to the terminal 200 through the communication unit 310. Here, the information on the authenticity of the electronic stamp includes information indicating that the electronic stamp is genuine and information indicating that the electronic stamp is forged.

That is, as a checking result (or a determination result), when the decrypted value is same as the membership ID, the control unit 350 verifies that the electronic stamp is genuine to transmit the information indicating that the electronic stamp is genuine to the terminal 200 through the communication unit 310.

Further, as the checking result (or the determination result), when the decrypted value is different from the membership ID, the control unit 350 verifies that the electronic stamp is forged to transmit the information indicating that the electronic stamp is forged to the terminal 200 through the communication unit 310.

Further, the electronic stamp server 300 may be implemented in a form such as a web server, a database server, and a proxy server. Further, in the electronic stamp server 300, one or more of various software which allows a network load distribution mechanism or an electronic stamp server 300 to operate on the Internet or other networks may be installed, and as a result, the electronic stamp server 300 may be implemented by a computerized system. Further, the network may be an http network and may be a private line, Intranet, or any other networks. Furthermore, the electronic stamp server 300 and the terminal 200 may be connected to each other by a security network so as to suppress the data from being attacked by any hacker or other third parties. Further, the electronic stamp server 300 may include a plurality of database servers. The database server may be implemented to be separately connected with the electronic stamp server 300 through any type of network connection including a distributed database server architecture.

Further, a processor mounted in the electronic stamp 100, the terminal 200, or the electronic stamp server 300 according to the exemplary embodiment of the present invention may process the program command to execute the method according to the exemplary embodiment of the present invention. In an implemented embodiment, the processor may be a single-threaded processor. In another implemented embodiment, the processor may be a multi-threaded processor. Further, the processor may process the command stored on the memory or the storing device.

As described above, it is possible to generate an encrypted value based on a membership ID related to a user of a terminal provided from the terminal and an one-time password such as an OTP generated in the electronic stamp, provide the generated encrypted value to the terminal in the electronic stamp, provide the membership ID, electronic stamp information, and the encrypted value to an electronic stamp server from the terminal, and obtain a decryption key based on the electronic stamp ID extracted from the electronic stamp information and then decodes the encrypted value based on the obtained decryption key, and verify the electronic stamp by comparing the decrypted value and the membership ID in the electronic stamp server, a control method thereof, and a non-transitory computer readable storage medium having a computer program recorded thereon.

Further, according to the present invention, a fingerprint of a user is recognized through an electronic stamp to allow only a person having an authority to manipulate the electronic stamp to operate the electronic stamp, and a fingerprint of a user having an authority for a user of the electronic stamp which is registered in advance in an electronic stamp server is compared with a fingerprint of a user which is recognized from the electronic stamp thereby activating an one-time password generating unit to generate an one-time password of the electronic stamp when the fingerprints match each other.

Hereinafter, a control method of an electronic stamp system for security intensification according to an exemplary embodiment of the present invention will be described in detail with reference to FIGS. 1 to 10.

Figure 6:
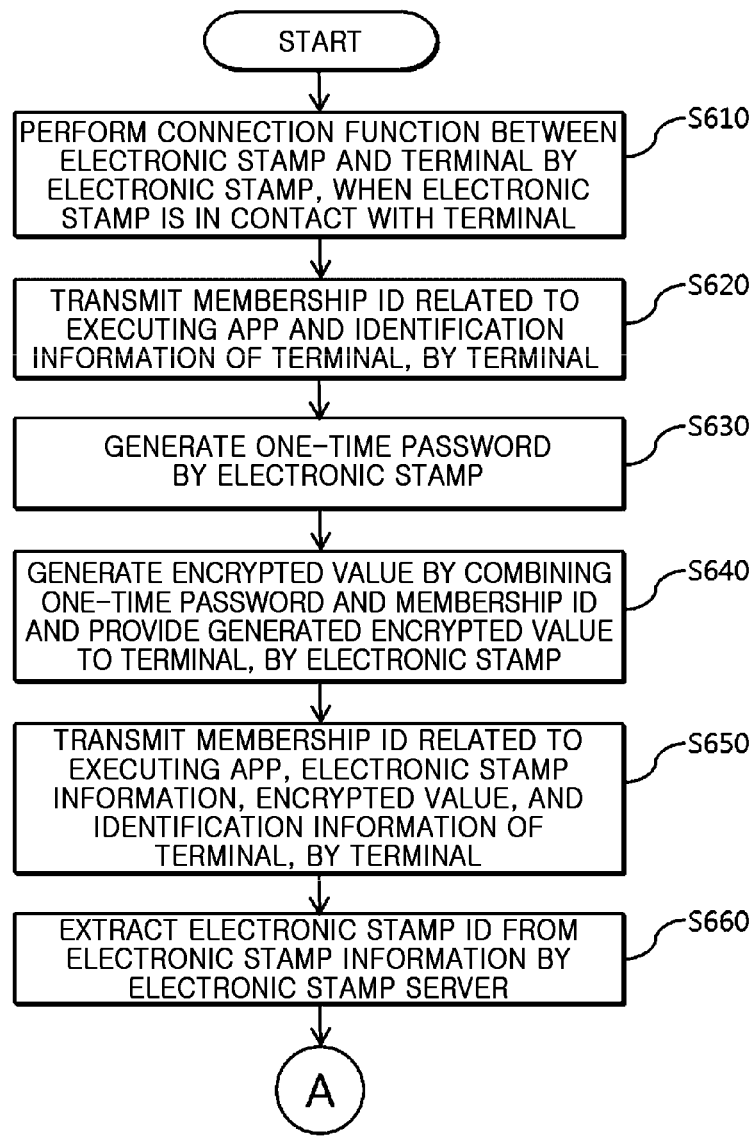
FIGS. 6 and 7 are flowcharts illustrating a control method of an electronic stamp system for security intensification according to a first embodiment of the present invention.
Figure 7:
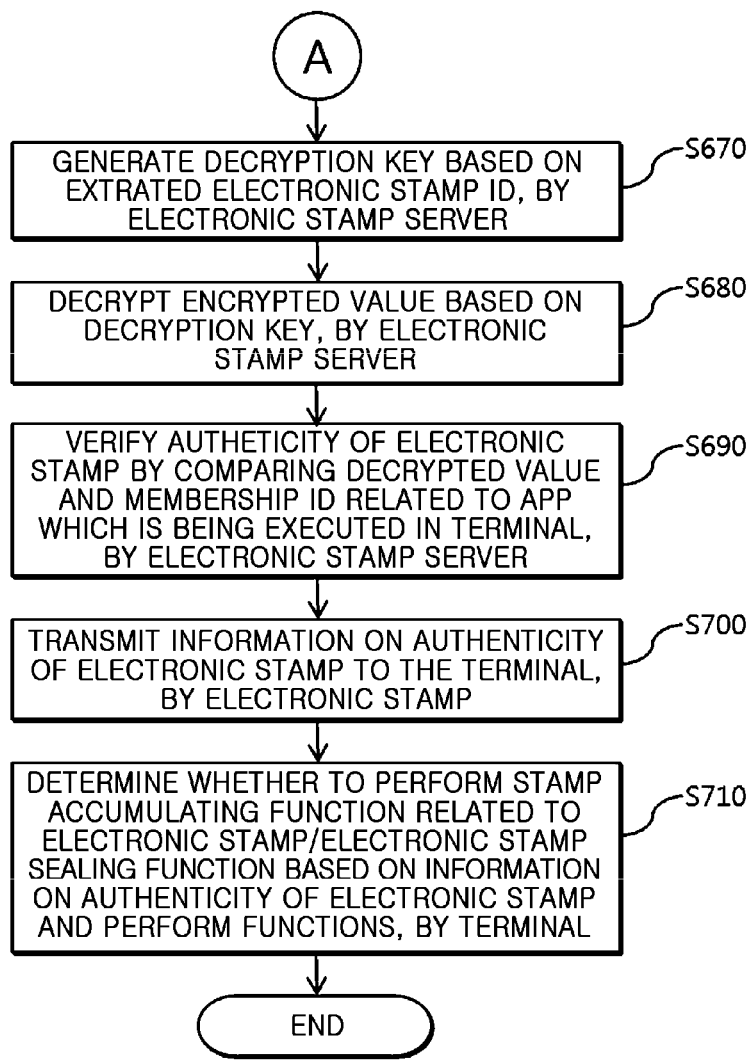

FIGS. 6 and 7 are flowcharts illustrating a control method of an electronic stamp system for security intensification according to a first embodiment of the present invention.

First, when the electronic stamp 100 is in contact with an electrostatic screen of the terminal 200 while executing an app (or application) which recognizes the electronic stamp 100 in the terminal 200, the terminal 200 is connected (or communicates) with the electronic stamp 100 by short range communication. Here, the short range communication technique may include Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, or the like.

That is, when a stamp accumulating function and an electronic stamp sealing function are provided through the electronic stamp 100 in association with the app which is being executed in the terminal 200, the electronic stamp 100 is in contact with the electrostatic screen of the terminal 200 to be connected with the terminal 200 through the short range communication.

For example, when a user of a first terminal 200 orders (or makes a payment for) coffee using a coffee shop and then a first electronic stamp 100 related to the coffee shop is in contact with a screen of a first terminal while executing a first coffee app related to the coffee shop in the first terminal related to the user, the first electronic stamp is connected to the first terminal by a Bluetooth communication scheme (S610).

Next, the terminal 200 transmits a membership ID related to an app which is being executed in the terminal 200 (or a membership ID related to a user of the terminal 200) and identification information of the terminal 200, to the electronic stamp 100. Here, the identification information of the terminal 200 includes an MDN, a mobile IP, a mobile MAC, a subscriber identify module (Sim) card unique information, and a serial number.

For example, the first terminal transmits the membership ID related to the first coffee app which is being executed in the first terminal and identification information of the first terminal to the first electronic stamp (S620).

Next, the electronic stamp 100 receives a membership ID related to an app which is being executed in the terminal 200 (or a membership ID related to a user of the terminal 200) and identification information of the terminal 200 which are transmitted from the terminal 200.

Further, the electronic stamp 100 generates a one-time password such as an OTP.

For example, the first electronic stamp receives the membership ID related to the first coffee app which is being executed in the first terminal and the identification information of the first terminal which are transmitted from the first terminal. Further, the first electronic stamp generates an eleventh OTP (S630).

Next, the electronic stamp 100 combines the generated one-time password and the previously received membership ID to generate an encrypted value.

Further, the electronic stamp 100 transmits the generated encrypted value to the terminal 200.

For example, the first electronic stamp combines the generated eleventh OTP and the membership ID related to the first coffee app which is being executed in the first terminal to generate an encrypted eleventh value. Further, the first electronic stamp transmits the eleventh value (or the encrypted eleventh value) to the first terminal (S640).

Next, the terminal 200 receives the encrypted value transmitted from the electronic stamp 100 in response to the membership ID related to an app which is being executed in the terminal 200 (or a membership ID related to a user of the terminal 200) and identification information of the terminal 200 which are previously transmitted.

Further, the terminal 200 transmits a membership ID related to an app which is being executed in the terminal 200 (or a membership ID related to a user of the terminal 200), the electronic stamp information, the encrypted value, and identification information of the terminal 200, to the electronic stamp server 300. Here, the electronic stamp information includes an electronic stamp ID used to generate a description key for decrypting the encrypted value.

For example, the first terminal receives the eleventh value (or the encrypted eleventh value) transmitted from the first electronic stamp in response to the membership ID related to the first coffee app which is being executed in the first terminal and the identification information of the first terminal.

Further, the first terminal transmits the membership ID related to the first coffee app which is being executed in the first terminal, the electronic stamp information, the eleventh value (or the encrypted eleventh value), and the identification information of the first terminal to the first electronic stamp server 300 (S650).

Next, the electronic stamp server 300 receives the membership ID related to an app which is being executed in the terminal 200 (or a membership ID related to a user of the terminal 200), the electronic stamp information, the encrypted value, and identification information of the terminal 200 which are transmitted from the terminal 200.

Further, the electronic stamp server 300 extracts the electronic stamp ID from the received electronic stamp information.

For example, the first electronic stamp server receives the membership ID related to the first coffee app which is being executed in the first terminal, the electronic stamp information, the eleventh value (or the encrypted eleventh value), and the identification information of the first terminal which are transmitted from the first terminal.

Further, the first electronic stamp server extracts the first electronic stamp ID from the received electronic stamp information (S660).

Further, the electronic stamp server 300 generates a decryption key based on the extracted electronic stamp ID.

That is, the electronic stamp server 300 obtains a decryption key from the extracted electronic stamp ID.

For example, the first electronic stamp server generates a first decryption key based on the extracted first electronic stamp ID (S670).

Next, the electronic stamp server 300 decrypts the encrypted value which is previously received based on the generated (or obtained) decryption key.

For example, the first electronic stamp server decrypts the eleventh value (or an encrypted eleventh value) based on the generated (or obtained) first decryption key to obtain a twenty first value (or a decoded twenty first value) (S680).

Next, the electronic stamp server 300 compares the decrypted value with the previously received membership ID to verify (or determine) authenticity of the electronic stamp.

For example, the first electronic stamp server checks whether the twenty first (or the decrypted twenty first) is identical with the membership ID related to the first coffee app which is being executed in the first terminal (S690).

Next, the electronic stamp server 300 transmits information on the verified (or determined) authenticity of the electronic stamp to the terminal 200. Here, the information on the authenticity of the electronic stamp includes information indicating that the electronic stamp is genuine and information indicating that the electronic stamp is forged.

That is, as a checking result (or a determination result), when the decrypted value is identical with the membership ID, the electronic stamp server 300 verifies that the electronic stamp is genuine to transmit the information indicating that the electronic stamp is genuine to the terminal 200.

Further, as a checking result (or a determination result), when the decrypted value is different from the membership ID, the electronic stamp server 300 verifies that the electronic stamp is forged to transmit the information indicating that the electronic stamp is forged to the terminal 200.

For example, when the twenty first value (or the decrypted twenty first value) is identical with the membership ID related to the first coffee app which is being executed in the first terminal, the first electronic stamp server confirms that the electronic stamp is genuine and transmits the information indicating the electronic stamp is genuine, to the first terminal.

As another example, when the twenty first value (or the decrypted twenty first value) is different from the membership ID related to the first coffee app which is being executed in the first terminal, the first electronic stamp server confirms that the electronic stamp is forged and transmits the information indicating the electronic stamp is forged, to the first terminal (S700).

Next, the terminal 200 receives information on authenticity of the electronic stamp transmitted from the electronic stamp server 300 in response to the membership ID related to an app which is being executed in the terminal 200 (or a membership ID related to a user of the terminal 200), the electronic stamp information, the encrypted value, and identification information of the terminal 200 which are previously transmitted.

Further, the terminal 200 determines whether to perform a stamp accumulating function (or whether to perform an electronic stamp sealing function) related to the electronic stamp, based on the received information on the authenticity of the electronic stamp.

That is, when it is verified that the electronic stamp is genuine, the terminal 200 performs the stamp accumulating function (or the electronic stamp sealing function) related to the electronic stamp and displays the stamp accumulating function performing result (or the electronic stamp sealing function performing result).

Further, when it is verified that the electronic stamp is forged, the terminal 200 stops the stamp accumulation related to the electronic stamp (or stamp accumulating function/the electronic stamp sealing function) and displays information indicating that the electronic stamp is forged.

Figure 8:
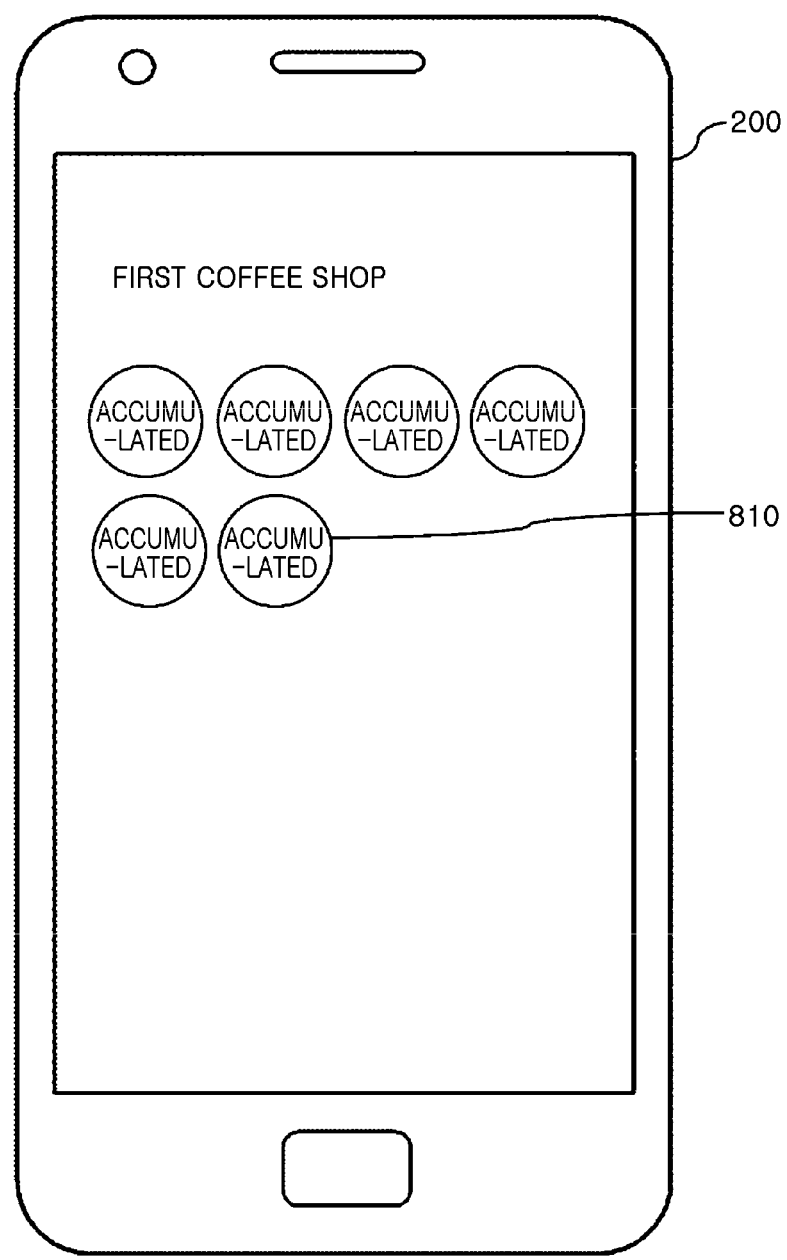
FIG. 8 is a view illustrating a screen of a terminal according to an embodiment of the present invention.

For example, the first terminal receives information indicating that the electronic stamp transmitted from a first electronic stamp server is genuine in response to the membership ID related to the first coffee app which is being executed in the first terminal, the electronic stamp information, an eleventh value (or an encrypted eleventh value), and identification information of the first terminal which are previously transmitted, performs the stamp accumulating function of the first coffee app through the electronic stamp based on the received information indicating that the electronic stamp is genuine, and displays a result 810 that the stamp is accumulated through the first coffee app, as illustrated in FIG. 8.

As another example, the first terminal receives information indicating that the electronic stamp transmitted from a first electronic stamp server is forged in response to the membership ID related to the first coffee app which is being executed in the first terminal, the electronic stamp information, the eleventh value (or the encrypted eleventh value), and the identification information of the first terminal which are previously transmitted and displays the received information indicating that the electronic stamp is forged through the first coffee app (S710).

Figure 9:
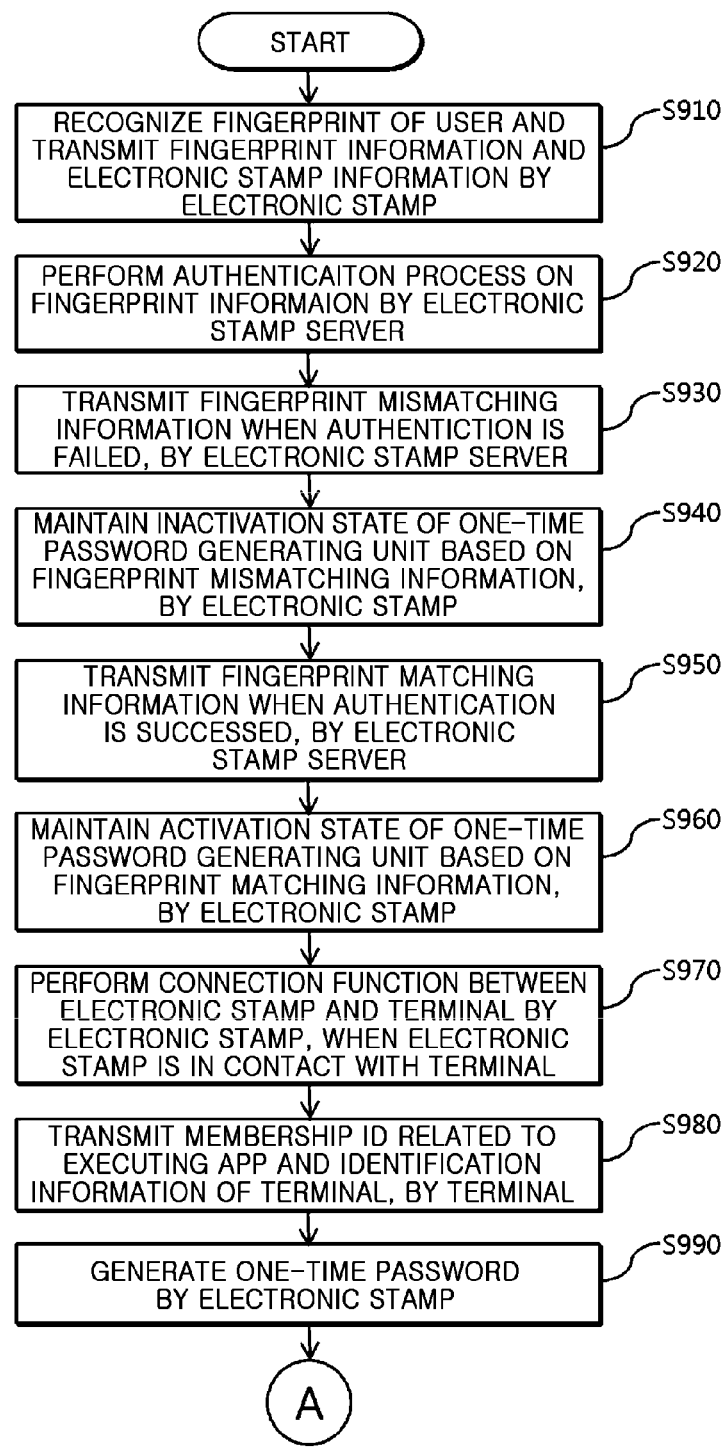
FIGS. 9 and 10 are flowcharts illustrating a control method of an electronic stamp system for security intensification according to a second embodiment of the present invention.
Figure 10:
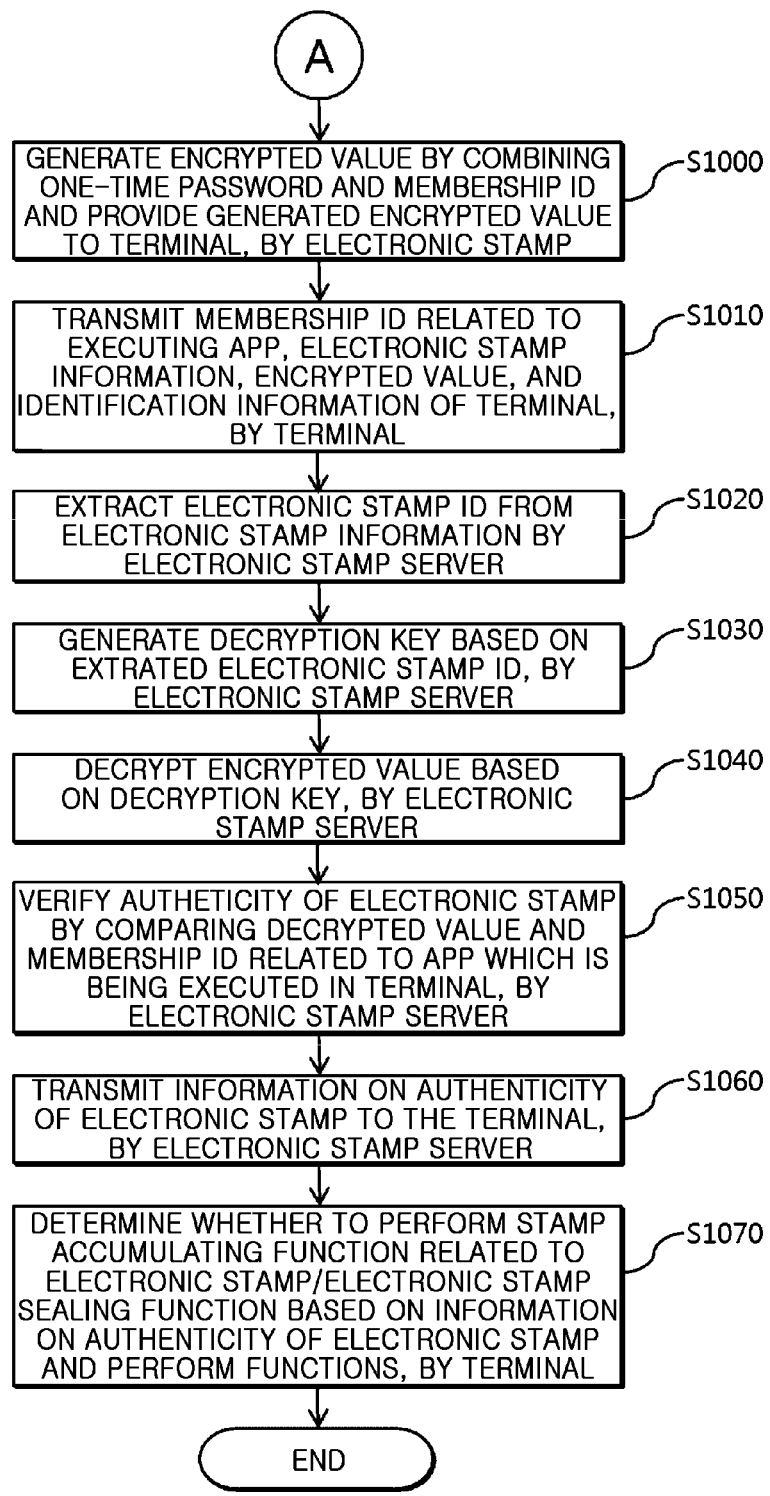

FIGS. 9 and 10 are flowcharts illustrating a control method of an electronic stamp system for security intensification according to a second embodiment of the present invention.

First, an electronic stamp 100 recognizes a fingerprint of a user who wants to use the electronic stamp 100.

Further, the electronic stamp 100 transmits recognized fingerprint information and electronic stamp information (for example, including an electronic stamp ID) to an electronic stamp server 300.

For example, a first electronic stamp 100 related to a coffee shop recognizes a fingerprint of a manager of the coffee shop who wants to use the first electronic stamp.

Further, the first electronic stamp transmits electronic stamp information including first recognized fingerprint information of the manager and an ID of the first electronic stamp to the first electronic stamp server 300 (S910).

Next, the electronic stamp server 300 receives the fingerprint information and the electronic stamp information (including the electronic stamp ID) transmitted from the electronic stamp 100.

Further, the electronic stamp server 300 performs an authentication process on the fingerprint information based on the received fingerprint information and electronic stamp information.

That is, the electronic stamp server 300 determines (or checks) whether the fingerprint information which is registered in advance in the electronic stamp server 300 correspondingly to the electronic stamp information matches the previously received fingerprint information. Here, there may be one or more fingerprint information which is registered in advance correspondingly to the electronic stamp information.

For example, the first electronic stamp server checks whether a plurality of fingerprint information registered in relation to a plurality managers of the coffee shop correspondingly to the electronic stamp information matches first fingerprint information transmitted from the first electronic stamp (S920).

As the checking result (or the determination result), when the fingerprint information which is registered in advance in the electronic stamp server 300 correspondingly to the electronic stamp information does not match the previously received fingerprint information (or when there is no fingerprint information which matches the previously received fingerprint information among a plurality of fingerprint information registered in advance in the electronic stamp server 300 correspondingly to the electronic stamp information), the electronic stamp server 300 transmits the fingerprint mismatching information indicating that the fingerprint information does not match the fingerprint information which is registered in advance (or the authentication failure information indicating that the authentication process is failed) to the electronic stamp 100.

For example, when there is no fingerprint information which matches the first fingerprint information transmitted from the first electronic stamp among the plurality of fingerprint information registered in relation to the plurality of managers of the coffee shop correspondingly to the electronic stamp information, the first electronic stamp server transmits fingerprint mismatching information (or authentication failure information) indicating that the first fingerprint information does not match the fingerprint information which is registered in advance (S930).

Next, the electronic stamp 100 receives the fingerprint mismatching information (or the authentication failure information) transmitted from the electronic stamp server 300 in response to the previously transmitted fingerprint information and the electronic stamp information (including the electronic stamp ID).

Further, the electronic stamp 100 maintains an one-time password generating unit 120 in the electronic stamp 100 to be in an inactivation state based on the received fingerprint mismatching information.

For example, the first electronic stamp receives the fingerprint mismatching information (or the authentication failure information) transmitted from the first electronic stamp server in response to the previously transmitted fingerprint information and the electronic stamp information including an ID of the first electronic stamp and maintains the one-time password generating unit 120 in the first electronic stamp to be in an inactivation state based on the received fingerprint mismatching information (S940).

Further, as the checking result (or the determination result), when the fingerprint information which is registered in advance in the electronic stamp server 300 correspondingly to the electronic stamp information matches the previously received fingerprint information (or when there is fingerprint information which matches the previously received fingerprint information among a plurality of fingerprint information registered in advance in the electronic stamp server 300 correspondingly to the electronic stamp information), the electronic stamp server 300 transmits the fingerprint matching information indicating that the fingerprint information matches the fingerprint information which is registered in advance (or the authentication success information indicating that the authentication process is successfully performed) to the electronic stamp 100.

For example, when there is fingerprint information which matches the first fingerprint information transmitted from the first electronic stamp among the plurality of fingerprint information registered in relation to the plurality of managers of the coffee shop correspondingly to the electronic stamp information, the first electronic stamp server transmits fingerprint matching information (or authentication success information) indicating that the first fingerprint information matches the fingerprint information which is registered in advance (S950).

Next, the electronic stamp 100 receives the fingerprint matching information (or the authentication success information) transmitted from the electronic stamp server 300 in response to the previously transmitted fingerprint information and the electronic stamp information (including the electronic stamp ID).

Further, the electronic stamp 100 activates the one-time password generating unit 120 in the electronic stamp 100 so as to use the electronic stamp based on received fingerprint matching information.

For example, the first electronic stamp receives the fingerprint matching information (or the authentication success information) transmitted from the first electronic stamp server in response to the first fingerprint information of the manager and the electronic stamp information including an ID of the first electronic stamp which are previously transmitted and activates the one-time password generating unit 120 in the first electronic stamp to be in a standby-state so as to use the first electronic stamp based on the received fingerprint matching information (S960).

Thereafter, when the electronic stamp 100 is in contact with an electrostatic screen of the terminal 200 while executing an app (or application) which recognizes the electronic stamp 100 in the terminal 200, the terminal 200 is connected (or communicates) with the electronic stamp 100 by short range communication. Here, the short range communication technique may include Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, or the like.

That is, when a stamp accumulating function and an electronic stamp sealing function are provided through the electronic stamp 100 in association with the app which is being executed in the terminal 200, the electronic stamp 100 is in contact with the electrostatic screen of the terminal 200 to be connected with the terminal 200 through the short range communication.

For example, when a user of the first terminal orders (or makes a payment for) coffee using a coffee shop and then the first electronic stamp related to the coffee shop is in contact with a screen of the first terminal while executing a first coffee app related to the coffee shop in the first terminal related to the user, the first electronic stamp is connected to the first terminal by a Bluetooth communication scheme (S970).

Next, the terminal 200 transmits a membership ID related to an app which is being executed in the terminal 200 (or a membership ID related to a user of the terminal 200) and identification information of the terminal 200, to the electronic stamp 100. Here, the identification information of the terminal 200 includes an MDN, a mobile IP, a mobile MAC, a subscriber identify module (Sim) card unique information, and a serial number.

For example, the first terminal transmits the membership ID related to the first coffee app which is being executed in the first terminal and the identification information of the first terminal to the first electronic stamp (S980).

Next, the electronic stamp 100 receives a membership ID related to an app which is being executed in the terminal 200 (or a membership ID related to a user of the terminal 200) and identification information of the terminal 200 which are transmitted from the terminal 200.

Further, the electronic stamp 100 generates a one-time password such as an OTP. In this case, when the one-time password generating unit 120 in the electronic stamp 100 is in an activation state, the electronic stamp 100 may generate the one-time password in accordance with the previously received fingerprint matching information. In this case, when the one-time password generating unit 120 in the electronic stamp 100 is in an inactivation state, the electronic stamp 100 cannot generate the one-time password in accordance with the previously received fingerprint mismatching information.

For example, when the one-time password generating unit 120 in the first electronic stamp is in an inactivation state, even though a membership ID related to the first coffee app which is being executed in the first terminal and the identification information of the first terminal which are transmitted from the first terminal are received, the first electronic stamp does not generate an OTP.

As another example, when the one-time password generating unit 120 in the first electronic stamp is in an activation state, the first electronic stamp receives the membership ID related to the first coffee app which is being executed in the first terminal and the identification information of the first terminal which are transmitted from the first terminal and generate an eleventh OTP (S990).

Next, the electronic stamp 100 combines the generated one-time password and the previously received membership ID to generate an encrypted value.

Further, the electronic stamp 100 transmits the generated encrypted value to the terminal 200.

For example, the first electronic stamp combines the generated eleventh OTP and the membership ID related to the first coffee app which is being executed in the first terminal to generate an encrypted eleventh value. Further, the first electronic stamp transmits the eleventh value (or the encrypted eleventh value) to the first terminal (S1000).

Next, the terminal 200 receives the encrypted value transmitted from the electronic stamp 100 in response to the membership ID related to an app which is being executed in the terminal 200 (or a membership ID related to a user of the terminal 200) and identification information of the terminal 200 which are previously transmitted.

Next, the terminal 200 transmits a membership ID related to an app which is being executed in the terminal 200 (or a membership ID related to a user of the terminal 200), the electronic stamp information, the encrypted value, and identification information of the terminal 200, to the electronic stamp server 300. Here, the electronic stamp information includes an electronic stamp ID used to generate a description key for decrypting the encrypted value.

For example, the first terminal receives the eleventh value (or the encrypted eleventh value) transmitted from the first electronic stamp in response to the membership ID related to the first coffee app which is being executed in the first terminal and the identification information of the first terminal.

Further, the first terminal transmits the membership ID related to the first coffee app which is being executed in the first terminal, the electronic stamp information, the eleventh value (or the encrypted eleventh value), and the identification information of the first terminal to the first electronic stamp server 300 (S1010).

Next, the electronic stamp server 300 receives the membership ID related to an app which is being executed in the terminal 200 (or a membership ID related to a user of the terminal 200), the electronic stamp information, the encrypted value, and identification information of the terminal 200 which are transmitted from the terminal 200.

Further, the electronic stamp server 300 extracts the electronic stamp ID from the received electronic stamp information.

For example, the first electronic stamp server receives the membership ID related to the first coffee app which is being executed in the first terminal, the electronic stamp information, the eleventh value (or the encrypted eleventh value), and the identification information of the first terminal which are transmitted from the first terminal.

Further, the first electronic stamp server extracts the first electronic stamp ID from the received electronic stamp information (S1020).

Next, the electronic stamp server 300 generates a decryption key based on the extracted electronic stamp ID.

That is, the electronic stamp server 300 obtains a decryption key from the extracted electronic stamp ID.

For example, the first electronic stamp server generates a first decryption key based on the extracted first electronic stamp ID (S1030).

Next, the electronic stamp server 300 decrypts the encrypted value which is previously received based on the generated (or obtained) decryption key.

For example, the first electronic stamp server decrypts the eleventh value (or an encrypted eleventh value) based on the generated (or obtained) first decryption key to obtain a twenty first value (or a decoded twenty first value) (S1040).

Next, the electronic stamp server 300 compares the decrypted value with the previously received membership ID to verify (or determine) authenticity of the electronic stamp.

For example, the first electronic stamp server checks whether the twenty first (or the decrypted twenty first) is identical with the membership ID related to the first coffee app which is being executed in the first terminal (S1050).

Next, the electronic stamp server 300 transmits information on the verified (or determined) authenticity of the electronic stamp to the terminal 200. Here, the information on the authenticity of the electronic stamp includes information indicating that the electronic stamp is genuine and information indicating that the electronic stamp is forged.

That is, as a checking result (or a determination result), when the decrypted value is identical with the membership ID, the electronic stamp server 300 verifies that the electronic stamp is genuine to transmit the information indicating that the electronic stamp is genuine to the terminal 200.

Further, as a checking result (or a determination result), when the decrypted value is different from the membership ID, the electronic stamp server 300 verifies that the electronic stamp is forged to transmit the information indicating that the electronic stamp is forged to the terminal 200.

For example, when the twenty first value (or the decrypted twenty first value) is identical with the membership ID related to the first coffee app which is being executed in the first terminal, the first electronic stamp server confirms that the electronic stamp is genuine and transmits the information indicating the electronic stamp is genuine, to the first terminal.

As another example, when the twenty first value (or the decrypted twenty first value) is different from the membership ID related to the first coffee app which is being executed in the first terminal, the first electronic stamp server confirms that the electronic stamp is forged and transmits the information indicating the electronic stamp is forged, to the first terminal (S1060).

Next, the terminal 200 receives information on authenticity of the electronic stamp transmitted from the electronic stamp server 300 in response to the membership ID related to an app which is being executed in the terminal 200 (or a membership ID related to a user of the terminal 200), the electronic stamp information, the encrypted value, and identification information of the terminal 200 which are previously transmitted.

Further, the terminal 200 determines whether to perform a stamp accumulating function (or whether to perform an electronic stamp sealing function) related to the electronic stamp, based on the received information on the authenticity of the electronic stamp.

That is, when it is verified that the electronic stamp is genuine, the terminal 200 performs the stamp accumulating function (or the electronic stamp sealing function) related to the electronic stamp and displays the stamp accumulating function performing result (or the electronic stamp sealing function performing result).

Further, when it is verified that the electronic stamp is forged, the terminal 200 stops the stamp accumulation related to the electronic stamp (or stamp accumulating function/the electronic stamp sealing function) and displays information indicating that the electronic stamp is forged.

For example, the first terminal receives information indicating that the electronic stamp transmitted from a first electronic stamp server is genuine in response to the membership ID related to the first coffee app which is being executed in the first terminal, the electronic stamp information, an eleventh value (or an encrypted eleventh value), and identification information of the first terminal which are previously transmitted, performs the stamp accumulating function of the first coffee app through the electronic stamp based on the received information indicating that the electronic stamp is genuine, and displays a result 810 that the stamp is accumulated through the first coffee app, as illustrated in FIG. 8.

As another example, the first terminal receives information indicating that the electronic stamp transmitted from a first electronic stamp server is forged in response to the membership ID related to the first coffee app which is being executed in the first terminal, the electronic stamp information, the eleventh value (or the encrypted eleventh value), and the identification information of the first terminal which are previously transmitted and displays the received information indicating that the electronic stamp is forged through the first coffee app (S1070).

The electronic stamp, the terminal, the electronic stamp server and the system including the same according to the embodiment of the present invention may be prepared with a computer program, and codes and code segments configuring the computer program may easily deduced by a computer programmer in the art. Further, the corresponding computer program is stored in a non-transitory computer readable storage medium, and read and executed by the electronic stamp, the terminal, and the electronic stamp server according to the embodiment of the present invention to implement the electronic stamp, the terminal, the electronic stamp server, and the system including the same.

The non-transitory computer readable storage medium includes a magnetic storage medium, an optical storage medium, and a carrier wave medium. The computer program implementing the electronic stamp, the terminal, the electronic stamp server, and the system including the same according to the embodiment of the present invention may be stored and installed in embedded memories of the electronic stamp, the terminal, and the electronic stamp server. Alternatively, external memories such as a smart card storing and installing the computer program implementing the electronic stamp, the terminal, the electronic stamp server, and the system including the same according to the embodiment of the present invention may be installed on the electronic stamp, the terminal, the electronic stamp server, and the system including the same through an interface.

As described above, according to the present invention, it is possible to generate an encrypted value based on a membership ID related to a user of a terminal provided from the terminal and an one-time password such as an OTP generated in the electronic stamp and provide the generated encrypted value to the terminal in the electronic stamp, provide the membership ID, electronic stamp information, and the encrypted value to an electronic stamp server from the terminal, and obtain a decryption key based on the electronic stamp ID extracted from the electronic stamp information and then decrypts the encrypted value based on the obtained decryption key, and verify authenticity of the electronic stamp by comparing the decrypted value and the membership ID in the electronic stamp server, thereby suppressing wrongful use by duplication of the electronic stamp so that economic loss due to a membership benefit which is improperly provided is avoided.

Further, according to the present invention, a fingerprint of a user is recognized through an electronic stamp to allow only a person having an authority to manipulate the electronic stamp to operate the electronic stamp, a fingerprint of a user having an authority for a user of the electronic stamp which is registered in advance in an electronic stamp server is compared with a fingerprint of a user which is recognized from the electronic stamp to activate an one-time password generating unit to generate an one-time password of the electronic stamp when the fingerprints match each other, thereby suppressing wrongful use of the electronic stamp.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments, and the following claims as well as all modified equally or equivalently to the claims are intended to fall within the scope and spirit of the invention.

The present invention has advantages which generates an encrypted value based on a membership ID related to a user of a terminal provided from the terminal and an one-time password such as an OTP generated in the electronic stamp and provides the generated encrypted value to the terminal in the electronic stamp, provides the membership ID, electronic stamp information, and the encrypted value to an electronic stamp server from the terminal, obtains a decryption key based on the electronic stamp ID extracted from the electronic stamp information and then decrypts the encrypted value based on the obtained decryption key, and verifies authenticity of the electronic stamp by comparing the decrypted value and the membership ID in the electronic stamp server, thereby suppressing wrongful use by duplication of the electronic stamp so that economic loss due to a membership benefit which is improperly provided is avoided and can be widely used in an electronic stamp field, a terminal field, an app field, and the like.

What is claimed is:

1. A control method of an electronic stamp system for security intensification, the control method comprising:
    transmitting a membership identification (ID) related to an application being executed in a terminal to an electronic stamp in contact with the terminal, wherein the application recognizes the electronic stamp;
    receiving, at the terminal from the electronic stamp, an encrypted value in response to sending the membership ID to the electronic stamp;
    transmitting the membership ID, electronic stamp information, the encrypted value, and identification information of the terminal to an electronic stamp server, by means of the terminal;
    extracting an electronic stamp ID from the electronic stamp information, by means of the electronic stamp server;
    generating a decryption key based on the extracted electronic stamp ID, by means of the electronic stamp server;
    decrypting the encrypted value transmitted from the terminal based on the generated decryption key, by means of the electronic stamp server;
    verifying authenticity of the electronic stamp by comparing the decrypted value and the membership ID transmitted from the terminal, by means of the electronic stamp server;
    transmitting information on verified authenticity of the electronic stamp to the terminal, by means of the electronic stamp server; and
    determining whether to perform a stamp accumulating function related to the electronic stamp or an electronic stamp sealing function based on the information on the authenticity of the electronic stamp, by means of the terminal.

2. The control method of claim 1, wherein the encrypted value is obtained by:
    connecting to the electronic stamp when the electronic stamp is in contact with an electrostatic screen of the terminal while executing the application which recognizes the electronic stamp in the terminal, by means of the terminal;
    transmitting the membership ID related to the application which is being executed in the terminal and the identification information of the terminal to the electronic stamp, by means of the terminal;
    generating an one-time password, by means of the electronic stamp;
    generating the encrypted value by combining the generated one-time password and the received membership ID, by means of the electronic stamp; and
    providing the generated encrypted value to the terminal, by means of the electronic stamp.

3. The control method of claim 1, wherein the transmitting of information on verified authenticity of the electronic stamp to the terminal includes any one of:
    verifying that the electronic stamp is genuine to transmit information indicating that the electronic stamp is genuine to the terminal, by means of the electronic stamp server when the decrypted value is identical to the membership ID transmitted from the terminal as a checking result; and
    verifying that the electronic stamp is forged to transmit information indicating that the electronic stamp is forged to the terminal, by means of the electronic stamp server when the decrypted value is different from the membership ID transmitted from the terminal as the checking result.

4. The control method of claim 3, wherein the determining of whether to perform a stamp accumulating function related to the electronic stamp or an electronic stamp sealing function based on the information on the authenticity of the electronic stamp includes:
    performing the stamp accumulating function related to the electronic stamp or the electronic stamp sealing function, by means of the terminal, when information, transmitted from the electronic stamp server, indicating that the electronic stamp is genuine; and
    displaying a stamp accumulating function performing result or an electronic stamp sealing function performing result, by means of the terminal.

5. The control method of claim 3, wherein the determining of whether to perform a stamp accumulating function related to the electronic stamp or an electronic stamp sealing function based on the information on the authenticity of the electronic stamp includes:
    stopping performing the stamp accumulating function related to the electronic stamp or the electronic stamp sealing function, by means of the terminal, when information, transmitted from the electronic stamp server, indicating that the electronic stamp is forged; and displaying information indicating that the electronic stamp is forged, by means of the terminal.

6. A non-transitory computer readable storage device having a computer program recorded thereon configured to perform the method according to claim 1.

7. A non-transitory computer readable storage device having a computer program recorded thereon configured to perform the method according to claim 2.

8. A non-transitory computer readable storage device having a computer program recorded thereon configured to perform the method according to claim 3.

9. A non-transitory computer readable storage device having a computer program recorded thereon configured to perform the method according to claim 4.

10. A non-transitory computer readable storage device having a computer program recorded thereon configured to perform the method according to claim 5.

11. An electronic stamp system for security intensification, the system comprising:

an electronic stamp which, when the electronic stamp is in contact with an electrostatic screen of a terminal while executing an application which recognizes the electronic stamp in the terminal, communicates with the terminal and provides an encrypted value to the terminal in response to receiving a membership identification (ID) related to the application which is being executed in the terminal, transmitted from the terminal;

the terminal which provides the membership ID related to the application which is being executed in the terminal, electronic stamp information, the encrypted value provided from the electronic stamp, and identification information of the terminal; and an electronic stamp server which extracts an electronic stamp ID from the electronic stamp information, generates a decryption key based on the extracted electronic stamp ID, decrypts the encrypted value provided from the terminal based on the generated decryption key, verifies authenticity of the electronic stamp by comparing the decrypted value and the membership ID provided from the terminal, and transmits information on the verified authenticity of the electronic stamp to the terminal.

12. The electronic stamp system of claim 11, wherein the electronic stamp generates a one-time password and generates the encrypted value by combining the generated one-time password and the membership ID transmitted from the terminal.

13. The electronic stamp system of claim 11, wherein when the decrypted value is identical to the membership ID transmitted from the terminal as a checking result, the electronic stamp server verifies that the electronic stamp is genuine to transmit information indicating that the electronic stamp is genuine to the terminal; and when the decrypted value is different from the membership ID transmitted from the terminal as a checking result, the electronic stamp server verifies that the electronic stamp is forged to transmit information indicating that the electronic stamp is forged to the terminal.

14. The electronic stamp system of claim 13, wherein when the information, transmitted from the electronic stamp server, indicating that the electronic stamp is genuine to the terminal is received, the terminal performs a stamp accumulating function related to the electronic stamp or an electronic stamp sealing function and displays a stamp accumulating function performing result or an electronic stamp sealing function performing result.

15. The electronic stamp system of claim 13, wherein when the information, transmitted from the electronic stamp server, indicating that the electronic stamp is forged to the terminal is received, the terminal stops performing the stamp accumulating function related to the electronic stamp or the electronic stamp sealing function and displays the information indicating that the electronic stamp is forged.

* * * * *